Patented Oct. 3, 1922.

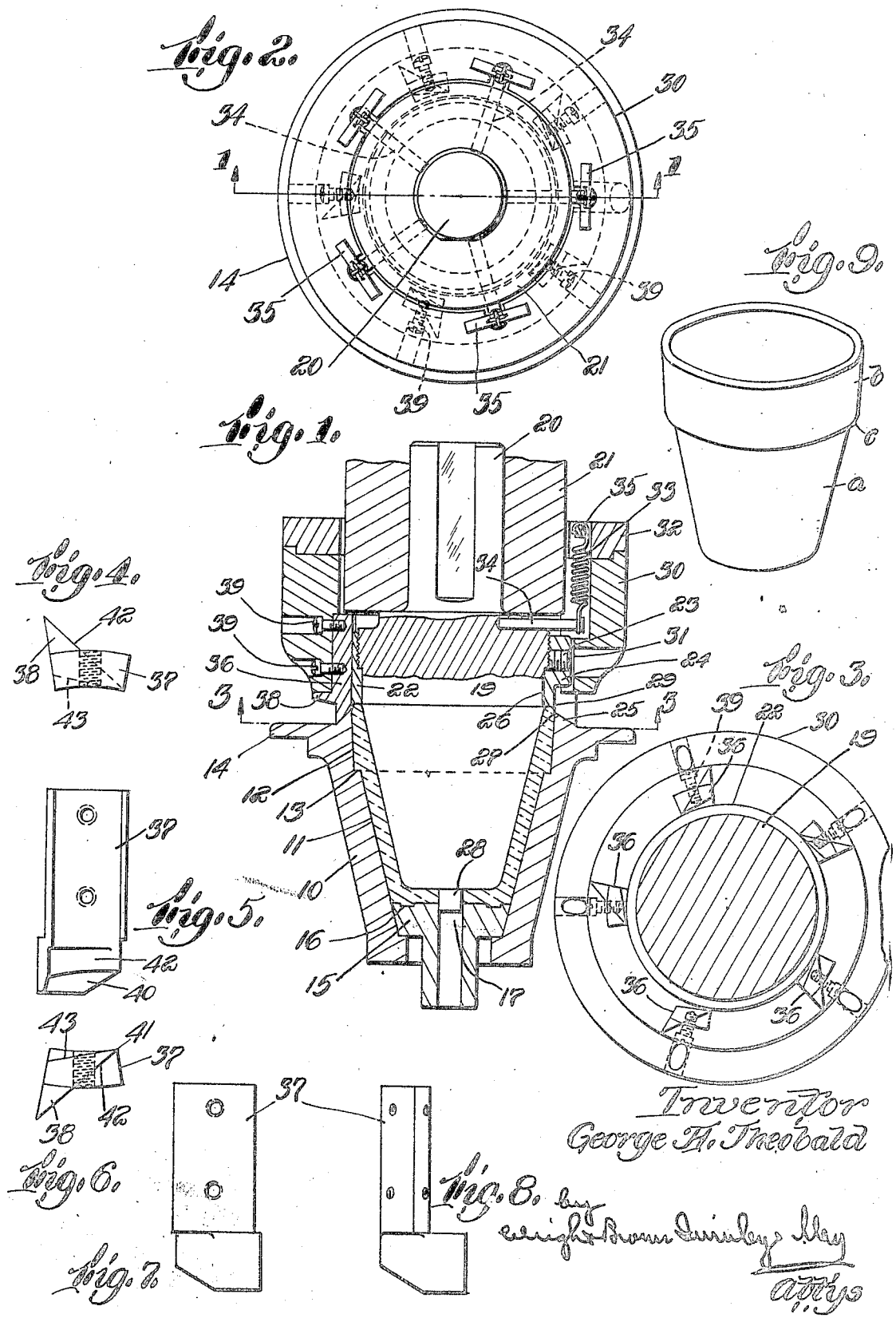

1,431,062

UNITED STATES PATENT OFFICE.

GEORGE A. THEOBALD, OF BOSTON, MASSACHUSETTS, ASSIGNOR, BY MESNE ASSIGNMENTS, TO A. H. HEWS & CO., INCORPORATED, OF CAMBRIDGE, MASSACHUSETTS, A CORPORATION OF MASSACHUSETTS.

MOLDING MACHINE.

Application filed December 13, 1920. Serial No. 430,115.

*To all whom it may concern:*

Be it known that I, GEORGE A. THEOBALD, a citizen of the United States, residing at Boston, in the county of Suffolk and State of Massachusetts, have invented new and useful Improvements in Molding Machines, of which the following is a specification.

This invention relates to machines for molding and forming articles of plastic or moldable material, such for example, as earthenware flower pots and other articles of generally cylindrical or frustoconical shape.

Heretofore it has been the practice to place the plastic material in a female mold of the proper shape, and then to introduce into the mold a male die or plunger of proper shape whereby the plastic material is formed in the desired shape. The plunger has also been provided with a member for forming the top or upper end of the molded article and to fit between the die and the upper edge of the female mold. But in practical operation, it has been found that due to the pressure of the parts, it has inevitably happened that some of the plastic material squeezed out between the top forming member and the upper edge of the mold, and left fins or ribs on the completed article, which had to be chipped off or otherwise removed after the article had been baked or otherwise caused to set or harden.

The object of the present invention is to provide means for overcoming the faults of such previous machines, and to provide a finished article free from defects.

On the drawing Fig. 1 represents in section the forming mechanism of a machine embodying the invention.

Fig. 2 represents the same in plan view.

Fig. 3 represents a cross section on the line 3—3 of Fig. 1.

Figs. 4 to 8 represent different views of one of the fin-trimming cutters.

Fig. 9 represents the finished article.

Referring to the drawing 10 indicates the mold or female member which is formed interiorly so as to impart the desired exterior formation to the completed article. For example, to produce a flower pot such as shown in Fig. 9 having a frustoconical body *a* and a cylindrical upper portion *b* with the intervening shoulder *c*, the mold 10, has the internal frustoconical wall 11, the cylindrical wall 12, and the shoulder 13. The mold may be provided near its upper end with flanges 14, for attachment to the frame of the machine. An ejecting plunger 15 which shapes the bottom of the article, forms the bottom wall of the mold, and it may be elevated by any suitable mechanism when the forming operation is completed, to eject the article from the mold. As shown it has a circular groove 16 to form a complemental rib on the bottom of the flower pot, and it also has a central aperture 17 to receive a pin or stud on the die, to be described, by which the usual hole is formed in the bottom of the pot.

The male die is of substantially frustoconical shape as shown. It is formed on a plunger 19 of cylindrical form and provided with a stem 20, secured to a member 21, which by suitable mechanism is caused both to rotate about its axis and to reciprocate longitudinally or axially. A top forming member or collar 22 is threaded onto the plunger 19 and after being adjusted to proper position, is secured in place by a set screw 23 passed through a boss or projection 24. It will be observed that the mold 10, has an inclined upper end wall 25, which terminates in an acute angle edge 27 and that when the die is depressed to extreme working position, as shown in Fig. 1, this edge is substantially in the plane of the upper end of the frustoconical portion of the die 19. The top forming member or collar has a concave lower end 26 which practically fills the space between the die and the mold, when the parts are in the position shown, and which forms the convex upper end of the completed flower pot.

In operation a lump of clay or other suitable plastic or moldable material is placed in the mold, at that period of the cycle of operations, in which the die is elevated above the mold and the ejector plunger rests in the bottom of the mold. The rapidly rotating die is then depressed gradually, and the material is molded and shaped in the form of a pot. The die has a central pin 28 which enters the aperture 17 in the ejector plunger to form the central hole in the bottom of the pot. The end member or collar 22 forms the upper edge of the pot.

With the parts operating as described, a certain amount of the clay or moldable material is forced outwardly through the crack between the edge 27 and the outer edge 29 of the top forming member, which leaves a fin or rib on the completed article. It is impossible, as a practical matter to cause the edges 27 and 29 to meet accurately to prevent the formation of the fin, and in fact some slight crack is necessary to permit the escape of surplus plastic material.

I provide mechanism which automatically removes the surplus escaping plastic material and removes the fins or ribs from the completed article so that it is substantially perfect in form.

This mechanism in the particular embodiment of the invention selected for illustration, comprises a plurality of knives which are arranged to cut off the fin as it is formed, and which are caused to rotate with the die. A collar or knife carrier 30 encircles the member 21 and a portion of the top forming member, and it has an internal vertical groove 31 into which the boss or projection 24 extends so that the die, the top forming member and the collar or knife carrier all rotate together. A member 32 bears upon the upper end of the collar and is drawn downwardly by a series of parallel springs 33. Each spring is secured at its lower end to a radial pin 34 projecting from the plunger 19, and at its upper end is hooked over a cross pin 35 dropped into a groove or recess in the top of the annular member 32. Thus the knife carrier or collar is drawn yieldingly downwardly, and is capable of a limited axial movement relatively to the die. The knife carrier is provided with a plurality of knives, one of which is indicated as a whole in Fig. 1 at 36. Each knife comprises a shank 37 which is concavo convex transversely, and which is set in an internal groove in the lower end of the annular carrier 30, so that its inner concave face fits accurately against the interior surface of the top forming member. The shank has a projection 38 which takes under the lower end of the carrier as best shown in Fig. 1. Each shank is secured in place by suitable fastenings such as screws 39 passed through the carrier. The knife head in each case extends below the knife carrier, and it is beveled as at 40 so that it may fit and slide accurately upon the beveled shoulder 25 of the mold. The cutting edge 41 of the knife is formed by two faces 42, 43 which are at an acute angle, the edges terminating in a circle having a radius equal to the radius of the cylindrical outer face of the top forming member 22, so that the edges rest against the outside surface of the said forming member 22, and cut a cylindrical surface on the molded article of the same diameter as the wall $b$. The edge is thus coincident with the inner face of the shank which in turn is flush with the inner face of the carrier. When the die descends, the beveled faces 40 engage the beveled surface 25 of the mold, and are stopped as the die descends a short distance further. The edges cut off any surplus material, the faces 42 carrying away the severed plastic material. As the die commences to ascend, the knives remain pressed against the mold, temporarily as the die leaves the completed article and ensure a smooth edge on the upper portion of the article.

It is obvious that various changes may be made in the mechanism which I have illustrated as embodying my invention without departing from the spirit and scope of the invention as defined in the claims. It will also be understood that while I have shown five knives and the same number of springs, these may be varied in number as may be desired. Furthermore, while the parts are illustrated as constructed to form and mold a flower pot of clay, which of course, is subsequently baked, they may be constructed to form and mold other articles from any suitable plastic or moldable material. I have shown the top former or forming member 22 as formed separately from the die to permit it to be independently adjusted, but of course, it may be made integrally therewith if desired. Moreover while its lower end is concave, it can be made flat or convex according to the shape desired in the finished article.

Having thus explained the nature of my invention and explained one embodiment thereof, without attempting to set forth all of the forms in which it may be made or all the modes of its use, what I claim is:

1. A mechanism for molding and forming articles of plastic material comprising a hollow mold formed with a beveled top surface, a rotary reciprocatory die complemental to said mold, a top former adjustably fixed to said die, a knife carrier slidable axially of said die and surrounding said top former, knives fixed to said carrier, each fitting about said top former and having a beveled portion complemental to said beveled top surface, and a spring urging said carrier to press said knives against said top surface when said die is within said mold.

2. A mechanism for molding and forming articles of plastic materials, comprising a hollow mold, a rotatable complemental die, a top former associated therewith, a yielding knife carrier rotatable with said die, and one or more knives thereon for trimming off surplus material expressed between the top former and the mold.

3. A mechanism for molding and forming articles of plastic materials, comprising a hollow mold, a complemental die, one of which elements is rotatable relatively to the other, a top former associated with the die, and knife mechanism for cutting away the material expressed between the top former and the mold, including a yielding annular knife carrier encircling the top former and provided with one or more knives adapted to trim off surplus material expressed between the top former and the mold.

4. A mechanism for molding and forming articles of plastic materials, comprising a hollow mold, formed with a beveled top surface, a rotary reciprocatory die complemental to the mold, an associated top former, a knife carrier encircling the former and having a knife formed with a beveled surface to engage said first-mentioned beveled surface, and having a cutting edge for trimming off material expressed from between the former and the mold.

5. A mechanism for molding and forming articles of plastic materials, comprising a hollow mold, a complemental die, one of which elements is rotatable relatively to the other, a top former associated with the die, and knife mechanism for cutting away the material expressed between the top former and the mold including a knife carrier and a series of knives thereon, each knife having acute angle faces terminating in a cutting edge coincident with the internal wall of the mold.

6. A knife for a molding apparatus having a shank with a transversely concave inner face, and a head having acute angle faces terminating in a cutting edge longitudinal of said shank.

7. In a molding mechanism, an annular knife carrier having one or more axially extending sockets, and one or more knives seated in said socket or sockets, each knife having a shank, and a head formed with acute angle faces terminating in a cutting edge longitudinal of the shank.

In testimony whereof I have affixed my signature.

GEORGE A. THEOBALD.